Feb. 4, 1947.  W. G. GERNANDT  2,415,130
ENGINE
Filed June 7, 1945  3 Sheets-Sheet 1

INVENTOR.
Waldo G. Gernandt.
BY
Grey & Smith
ATTORNEYS.

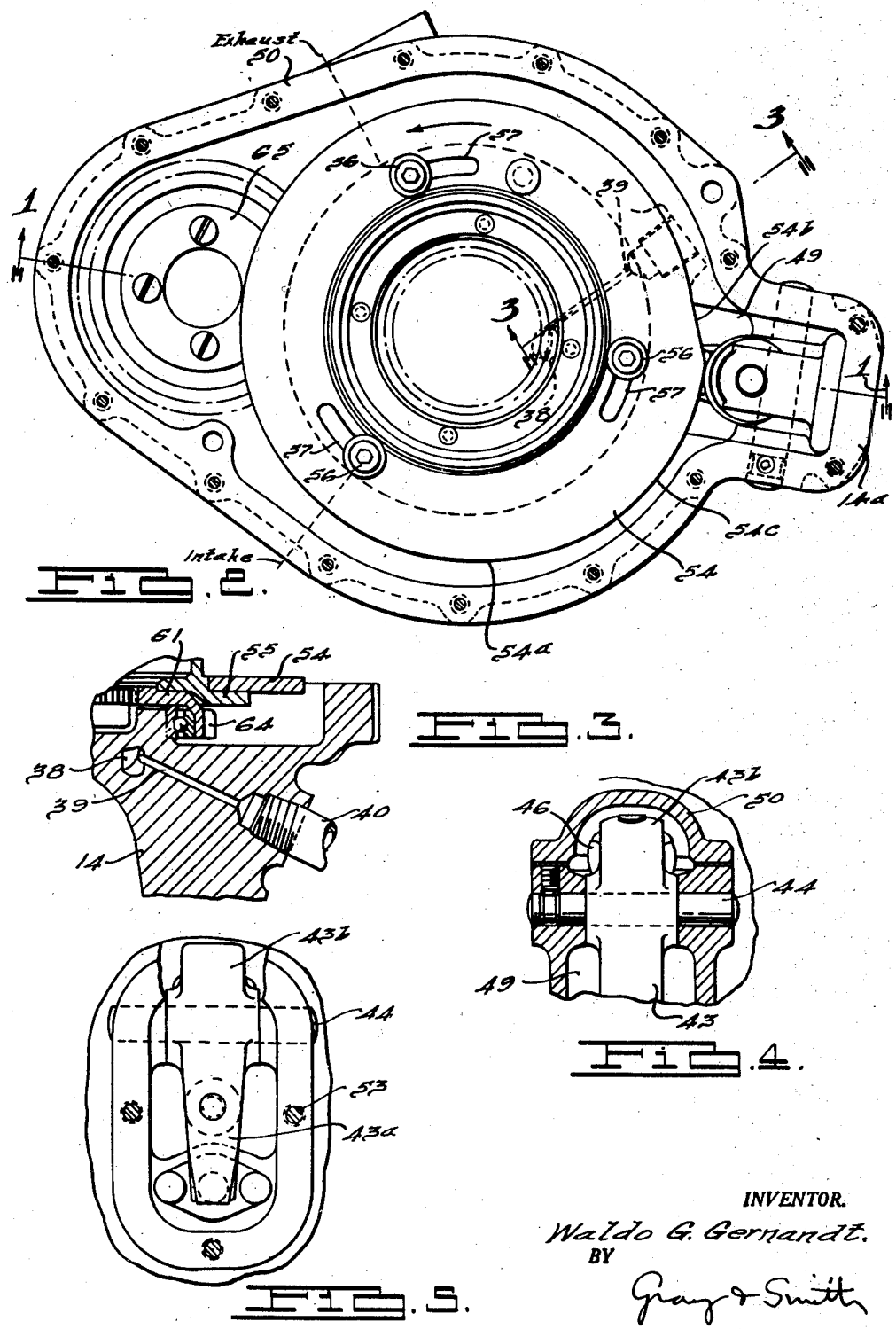

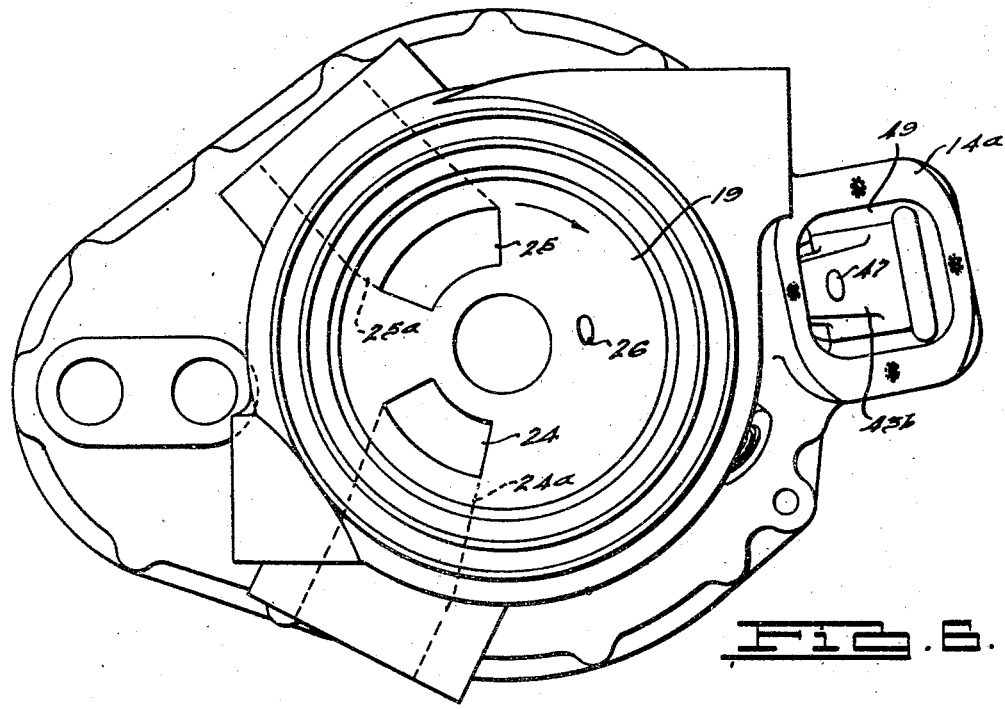
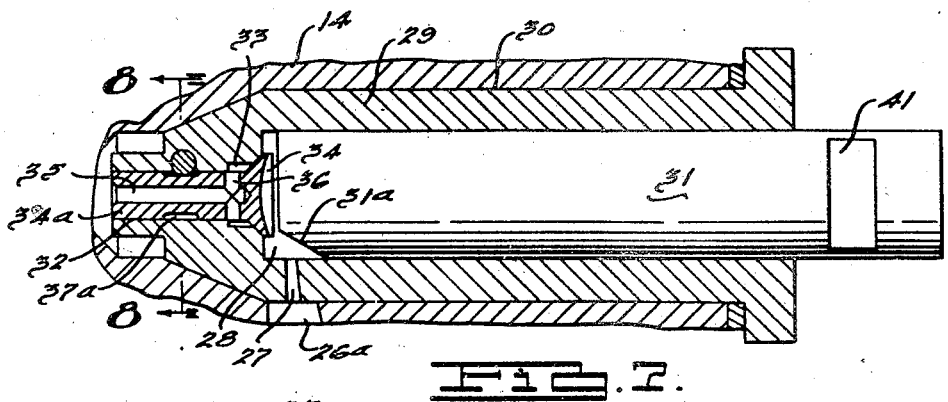
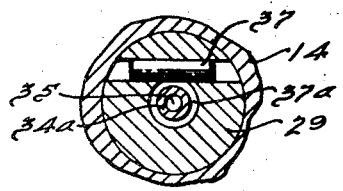

Patented Feb. 4, 1947

2,415,130

UNITED STATES PATENT OFFICE 2,415,130

ENGINE

Waldo G. Gernandt, Detroit, Mich., assignor to Briggs Manufacturing Company, Detroit, Mich., a corporation of Michigan Application June 7, 1945, Serial No. 598,129

24 Claims. (Cl. 123—80)

1

This invention relates to internal combustion engines of the rotary valve type and particularly to an engine of this kind in which the combustible mixture or fuel charge is fired by the heat of compression.

The present invention has particular application to an internal combustion engine of the kind in which the rotatable valve in the head, preferably although not necessarily of the kind which rotates continuously in one direction, is formed with substantially all or at least the major portion of the combustion chamber and is generally conical or frusto-conical in shape. The combustion chamber within the rotor or rotary valve has an opening at one end leading to the cylinder and a second opening preferably at a side thereof adapted to communicate during operation with an outlet or inlet passage, or both, as the case may be, and the combustible charge is fired in improved manner by compressing the same sufficiently to raise the same to ignition temperature.

An object of the present invention is to provide an internal combustion engine of the rotatable valve type operating on the Diesel principle and in which the formation of the combustible mixture and the compression thereof to ignition temperature are accomplished in improved manner.

A further object of the invention is to provide an engine having a rotatable valve, preferably of the frusto-conical type, formed with a combustion chamber and a side port adapted to communicate at a predetermined time in the compression stroke of the piston with an injector or pump cylinder, the improved construction and operation being such that a compressed charge of fuel and air, intimately mixed, is produced in the injector cylinder by the piston during a portion of its compression stroke and thereafter the mixture is raised to ignition temperature by the coordinated action of the piston and the compression stroke of the injector plunger, thereby causing the firing of the mixture to be initiated in the injector cylinder with flame propagation and expansion of gases progressing rapidly without detonation through the valve side port into the valve combustion chamber.

Still another object of the invention is to provide a pump or injector device associated with the combustion chamber in a rotatable frustoconical engine valve and operative to augment the compressive action of the engine piston on the mixture within the injector cylinder or chamber to an extent necessary to induce igni-

2 tion of the mixture by the heat of compression.

A further object of the invention is to provide an engine having a rotatable valve, preferably of generally conical form, formed with a combustion chamber and a side port communicable at a given time during the compression stroke of the engine piston with an injection or pump chamber into which fuel has previously been drawn or introduced and within which a fuel and air mixture is produced by the compression stroke of the piston, the injection chamber having a reciprocable plunger actuated in improved and novel manner by cam mechanism operated from the valve drive means and so timed as to cause the plunger to augment the compressive action of the engine piston, with the result that the mixture will be fired by the heat developed consequent to the conjoint compressive action of the engine piston and plunger.

Other objects of this invention will appear in the following description and appended claims, reference being had to the accompanying drawings forming a part of this specification wherein like reference characters designate corresponding parts in the several views.

Fig. 2 is a section taken substantially through lines 2—2 of Fig. 1 looking in the direction of the arrows.

Fig. 3 is a fragmentary section taken substantially through lines 3—3 of Fig. 2 looking in the direction of the arrows.

Fig. 4 is a section taken substantially through lines 4—4 of Fig. 1 looking in the direction of the arrows.

Fig. 5 is a fragmentary section taken substantially through lines 5—5 of Fig. 1 looking in the direction of the arrows.

Fig. 6 is a bottom plan view of a portion of the cylinder head illustrating the valve receiving cavity or chamber with the valve removed.

Fig. 7 is a fragmentary sectional view taken through the fuel injector or pump device.

Fig. 8 is a section taken substantially through lines 8—8 of Fig. 1 looking in the direction of the arrows.

Figure 1:
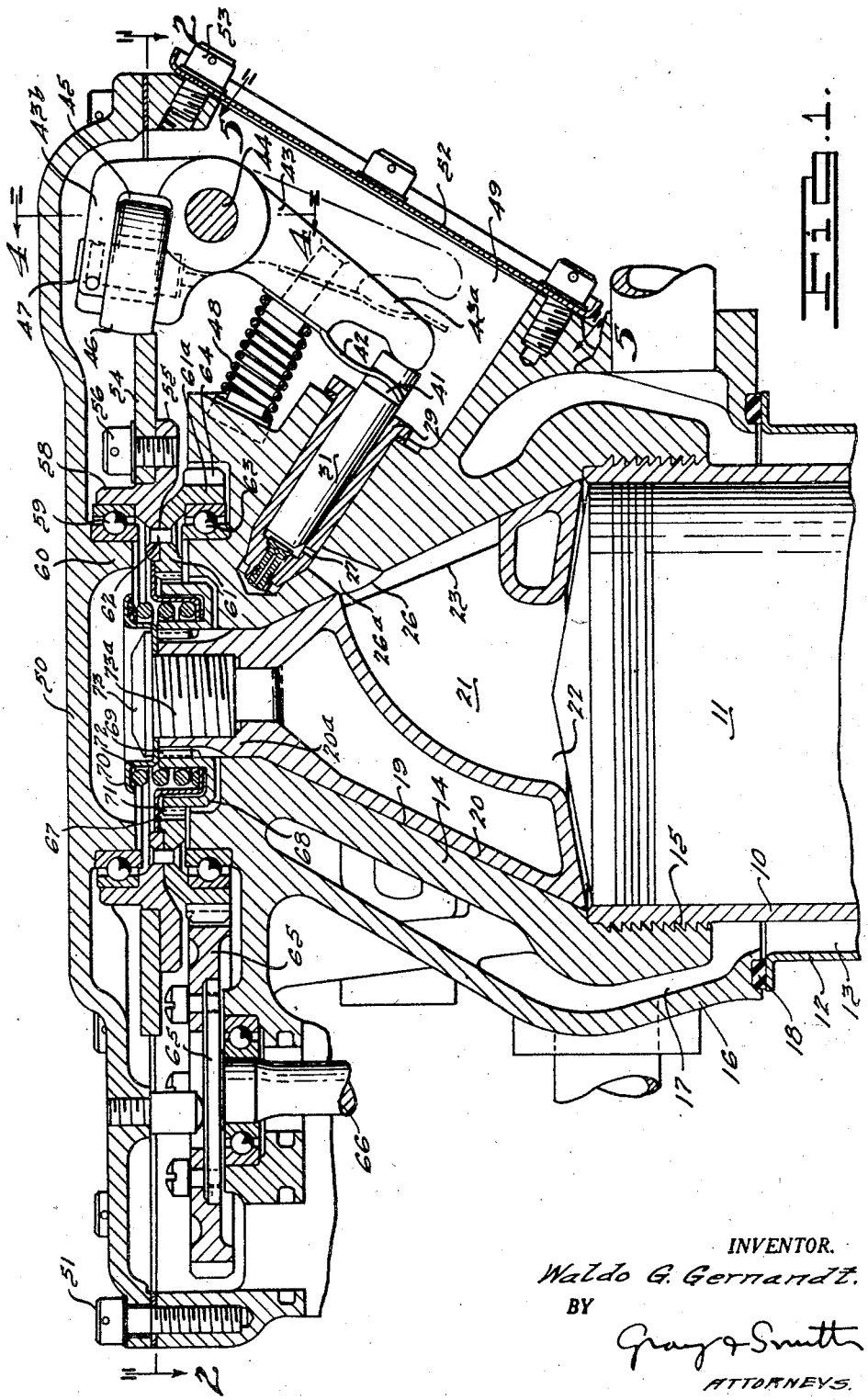
Fig. 1 is a fragmentary sectional elevation, taken through lines 1—1 of Fig. 2 looking in the direction of the arrows, illustrating a portion of a multi-cylinder engine embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the present invention as applied to an internal combustion engine of the Diesel type which may be used for the power plant of an aircraft or motor vehicle or for other purposes, such as for marine and industrial engines. For most uses the engine is of the multi-cylinder type, although it will be understood that one or more cylinder units may be employed in any given engine. In the present embodiment, for the purposes of simplicity, a single cylinder unit of the engine is illustrated, it being understood that the remaining cylinders of the engine are substantially identical to the structure herein shown and described.

Referring to Fig. 1, the present engine comprises a suitable crankcase (not shown) carrying a cylinder 10 within which a piston 11 is mounted for reciprocation. According to conventional practice the engine is provided with a crankshaft supported in suitable bearings in the crankcase and the piston is connected to the crankshaft by a connecting rod.

In the present embodiment the engine is illustrated as being of the liquid cooled type and, accordingly, the cylinder 10 is mounted within a cylinder jacket 12, the lower end of which is secured to the crankcase. The cylinder jacket 12 is spaced from the cylinder 10 to provide a liquid coolant chamber 13. The present engine also comprises a cylinder head 14 which is rigidly secured to the upper end of the cylinder through the medium of a threaded connection 15. The cylinder head is cast to provide a depending skirt 16 forming with the inner portion of the cylinder head a liquid coolant chamber 17 communicating with the chamber 13. Interposed between the skirt portion 16 of the cylinder and the jacket 12 is a sealing ring 18 which is held under compression to provide a liquid tight seal against the leakage of the coolant from the communicating chambers 13 and 17.

The portion of the cylinder head immediately above the piston 11 is formed with a generally frusto-conical cavity or recess 19 within which is rotatably mounted a generally frusto-conical valve 20, it being understood that the outer tapering wall of the valve corresponds generally to the shape of the juxtaposed wall of the cavity 19. The valve 20 is provided with a combustion chamber 21 having a centrally disposed bottom annular port 22 arranged in constant communication with the cylinder and also provided with a side port 23. The cylinder head, as illustrated in Fig. 6, is formed with circumferentially spaced exhaust and air intake ports 24 and 25 respectively, the port 24 communicating with an exhaust conduit 24a and the port 25 communicating with an air intake conduit 25a. At the opposite side of the cylinder head cavity 19 from the ports 24 and 25 the cylinder head is formed with a relatively smaller fuel injector or ignition port 26 communicating with an outwardly and upwardly tapering passage 26a which, as illustrated in Figs. 1 and 7, in turn communicates with a small restricted orifice or duct 27 leading into the cylindrical bore or chamber 28 provided in the barrel of an injection or pump cylinder 29 fixed within a correspondingly shaped bore or hole 30 in the cylinder head 14.

Mounted for reciprocation within the bore or chamber 28 of the cylinder 29 is a plunger 31, which in its fully projected position as illustrated in Fig. 7, is adapted to extend nearly to the inner end of the chamber. In order not to block off the passage 27 and to maintain this passage in communication with the cylinder bore at all times, the inner end of the plunger 31 is cut away at 31a.

The inner end of the cylinder barrel 29 is drilled to provide a passage 32 communicating with an enlarged chamber 33 which is formed with a tapered valve seat engaged by a valve 34 which, in Fig. 7, is shown positioned to close off the passage 32. The valve 34 is provided with a valve stem 34a fitting into the passage 32 and centrally drilled to form a passage 35 communicating with the chamber 33 by means of ducts 36. With this construction it will be seen that when the valve 34 is withdrawn from its seat communication between the passage 35 and chamber 28 will be established through the ducts 36 and valve chamber 33. The valve 34 and its stem 34a are permitted limited longitudinal travel for opening and closing movement of the valve by means of a pin 37 projecting within an annular slot 37a in the valve stem.

The passage 35 in the valve stem 34a communicates with a small chamber 38 in the cylinder head into which leads a drilled passage 39 enlarged and tapped at its outer end to receive the threaded end of a pipe or tube 40 connected to a suitable source of fuel.

The outer end of the injector plunger 31 is machined to provide opposed slots or grooves 41 within which is anchored the bifurcated end of a spring bar 42 rigidly secured to one arm 43a of a bell crank lever 43 pivotally mounted on a transverse pin 44 secured within a recessed boss 14a of the cylinder head, as seen in Figs. 1 and 2. The end of the arm 43a of the bell crank is maintained in constant engagement with the outer end of the injector plunger 31. The upper arm 43b of the bell crank has a slot 45 to receive a cam roller 46 rotatably mounted or journalled on a pin 47 secured to the arm 43b of the bell crank. Interposed between the lower arm 43a of the bell crank lever and a recessed portion of the cylinder head is a compression spring 48 which at all times tends to urge the arm 43a outwardly toward the dotted line position illustrated in Fig. 1. It will be seen that when the bell crank is rotated from the dotted line position to the full line position in Fig. 1 the injector plunger 31 will be shifted inwardly by virtue of the positive engagement of the bell crank arm with the end of the plunger. Reverse movement of the bell crank is accomplished by the compression spring 48 and is transmitted to the plunger 31 through the medium of the bifurcated spring bar 42.

The mechanism above described for actuating the injector device is housed within the recessed portion 49 of the cylinder head boss 14a. Access to the mechanism within the upper portion of the cylinder head is obtained by means of a cover plate 50 which may be tightly secured in position on the cylinder head by means of screws 51. The boss 14a is provided with a side opening for access to the injector mechanism, which opening is normally closed by means of a closure plate 52 removably secured in position by means of screws 53.

The cam roller 46 is maintained in constant engagement with the peripheral edge of a cam 54 which in the present instance is in the form of a ring or plate centrally apertured and fitting into a machined seat in the upper face of a cam supporting ring or carrier 55, the cam ring 54 being secured to the carrier 55 by means of screws 56 extending through arcuate adjusting slots 57 in the cam ring and into tapped holes in the cam carrier 55. This construction permits the position of the cam ring 54 to be adjusted circumferentially with respect to the cam roller 46 thereby advancing or retarding the time of operation of the injector plunger 31. As illustrated in Fig. 1, the cam supporting ring or carrier 55 is formed with an annular upwardly extending flange 58 between which and an annular depending boss 60 of the cover plate 50 is interposed a ball bearing race 59. The cam supporting ring 55 is supported upon the upper face of a ring gear 61, being riveted thereto at 62. This gear has a depending marginal flange 61a projecting into a circular recess in the top of the cylinder head and supported for rotation therein by means of a ball bearing race 63. The gear 61 is provided with teeth 64 meshing with the teeth of a gear 65 secured to a tower shaft 66 journalled in the cylinder head and connected at its lower end by suitable gearing with the crankshaft of the engine so as to drive the gear 61 at one half crankshaft speed. The ring gear 61 has a splined connection at 67 with a recessed coupling member 68 embracing the upwardly projecting stem 20a of the valve 20 and having a splined connection 69 therewith. Overlying the upper end of the stem 20a is a spring retainer 70 between which and a spring retainer 71 mounted within the coupling 68 is a compression spring 72. The spring retainer 70 is rigidly secured to the upper end of the valve stem by the overlapping head of a stud 73 having a threaded stem 73a screwed into a tapped hole in the upper end of the valve stem.

With the valve 20 and cam 54 rotating in the direction of the arrow in Fig. 2 the valve side port 23 will register with the exhaust port 24 during the exhaust stroke of the piston 11, and thereafter will register with the intake port 25 during the intake stroke of the piston, thus drawing air into the combustion chamber 21. During this period when the cam roller 46 is in engagement with the low arcuate surface 54a of the cam 54 the bell crank lever will be held by spring 48 in the dotted line position of Fig. 1 with the injector plunger 31 retracted and a charge of fuel drawn into the chamber 28. Continued rotation of the valve and cam in the direction of the arrow in Fig. 2 will bring the valve side port 23 into registry with the orifice 26. The side port will commence to uncover the injection orifice at a given point in the upward travel of the piston during its compression stroke, such for example at approximately 60° before top dead center. As soon as the orifice is uncovered compressed air within the combustion chamber 21 will be forced by the piston through passage 26a and duct 27 into the injector chamber 28, the plunger 31 remaining retracted for an interval of time as this action occurs. At the time the valve port uncovers the orifice 26 there exists a partial vacuum within the injector chamber 28, and as the hot air is forced into this chamber considerable turbulence is created therein which aids materially in producing a very thorough and intimate mixing of the air and fuel in the chamber. Of course it will be understood that the pressure of the air forced into the injector chamber closes the check valve 34 and maintains it tightly in engagement with its seat. The pressure created within the injector chamber during this period of compression and creation of a fuel mixture will raise appreciably the temperature of the mixture.

At preferably a few degrees before top dead center the cam roller engages inclined cam surface 54b on the cam 54, resulting in forcing the roller outwardly, rocking the bell crank lever 43, and shifting the end 43a thereof inwardly or to the left in Fig. 1. This operation forces the injector plunger 31 inwardly to the position shown in Fig. 7 thereby further compressing the mixture in the chamber 28, this action being carried out in coordination with the piston 11 as the latter comes to the end of its compression stroke. This additional compression of the fuel mixture accomplished by the action of the plunger will build up the pressure in the injector chamber and raise the temperature of the mixture to a point above ignition temperature thereby causing the mixture to be fired by the heat of compression. The pressure and temperature at this time within the injector chamber will be greater than within the combustion chamber 21 due to the restricted or small size of the duct 27. Combustion of the fuel mixture is thus initiated within the injector chamber and expansion of gases as well as rapid flame propagation proceeds through passage 26a, orifice 26, and valve side port 23 into the combustion chamber 21 in the valve. During the power stroke of the piston, and while the valve side port maintains the orifice 26 uncovered the cam roller 46 engages the arcuate surface 54c of the cam, thus holding the injector plunger 31 in its full inward position shown in Fig. 7. When the valve side port passes beyond the orifice 26 and the latter is then closed or covered by the side wall of the valve, the cam roller travels down onto the low arcuate surface 54a of the cam permitting the spring 48 to rock the bell crank lever and the injector plunger to be retracted by member 42. Retraction of the plunger opens by suction the check valve 34 and draws into the injector chamber a controlled amount of liquid fuel in amount appreciably less than the effective volume of the chamber and in advance of the plunger when in retracted position. From this point the cycle of operations above described is repeated.

The injector mechanism in conjunction with the cone-type rotary valve provides an engine which will operate with a high degree of efficiency and economy while utilizing a variety of inexpensive hydrocarbon fuels. No increase in the compression ratio is required in order to fire the fuel charge by the heat of compression, and in fact efficient combustion is obtainable with a compression ratio not exceeding twelve to one.

I claim:

1. In an internal combustion engine, a cylinder having a reciprocable piston therein, a valve associated with said cylinder and having a combustion chamber and a port communicating therewith, a fuel mixing chamber adapted to communicate intermittently with said combustion chamber through said valve port during operation of the valve, and means operative at a predetermined time during the compression stroke of the piston when said valve port is in communication with said mixing chamber for compressing a fuel mixture in said mixing chamber to a pressure greater than the pressure in said combustion chamber.

2. In an internal combustion engine, a cylinder having a reciprocable piston therein, a valve associated with said cylinder and having a combustion chamber and a port communicating therewith, a fuel mixing chamber adapted to communicate intermittently with said combustion chamber through said valve port during operation of the valve, and a reciprocable plunger operative at a predetermined time during the compression stroke of the piston when said valve port is in communication with said mixing chamber for compressing a fuel mixture in said mixing chamber to a pressure greater than the pressure in said combustion chamber.

3. In an internal combustion engine, a cylinder having a reciprocable piston therein, a cylinder head, a valve in said head associated with the cylinder and having a combustion chamber and a side port communicating therewith, a fuel mixing chamber connected to a source of fuel supply and adapted to communicate periodically with said combustion chamber, a reciprocable plunger in said mixing chamber, and means for operating said plunger at a predetermined time during the compression stroke of the piston when said side port is in communication with said mixing chamber thereby to compress a fuel mixture in said mixing chamber and raise the pressure and temperature thereof above the pressure and temperature in the combustion chamber.

4. In an internal combustion engine, a cylinder having a reciprocable piston therein, a valve having a combustion chamber in constant communication with said cylinder and also having a side port, a fuel chamber, a passage including a restricted portion leading from said fuel chamber to the valve and communicating with the combustion chamber through said side port during a portion of the compression stroke of the piston whereby a compressed fuel mixture is formed in said fuel chamber, and means for additionally compressing said mixture within said fuel chamber to a point greater than the pressure in the combustion chamber thereby to induce combustion thereof of said mixture.

5. In an internal combustion engine, a cylinder having a reciprocable piston therein, a valve having a combustion chamber in constant communication with said cylinder and also having a side port, a fuel chamber, a passage leading from said fuel chamber to the valve and communicating with the combustion chamber through said side port during a portion of the compression stroke of the piston whereby a compressed fuel mixture is formed in said fuel chamber, a reciprocable plunger in said fuel chamber, and means for shifting said plunger to additionally compress the mixture within said fuel chamber and induce combustion thereof by the heat of compression.

6. In an internal combustion engine, a cylinder having a reciprocable piston therein, a valve having a combustion chamber in constant communication with said cylinder and also having a side port, a fuel chamber, a passage leading from said fuel chamber to the valve and communicating with the combustion chamber through said side port during a portion of the compression stroke of the piston whereby a compressed fuel mixture is formed in said fuel chamber, a reciprocable plunger in said fuel chamber, and means drivingly connected to said valve for shifting said plunger to additionally compress the mixture within said fuel chamber and induce combustion thereof by the heat of compression.

7. In an internal combustion engine, a cylinder having a reciprocable piston therein, a valve having a combustion chamber in constant communication with said cylinder and also having a side port, a fuel chamber, a passage leading from said fuel chamber to the valve and communicating with the combustion chamber through said side port during a portion of the compression stroke of the piston whereby a compressed fuel mixture is formed in said fuel chamber, a reciprocable plunger in said fuel chamber adapted to draw fuel into the chamber during one stroke thereof and to compress the fuel mixture therein to a pressure greater than the pressure in said combustion chamber during the opposite stroke thereof, and means for reciprocating said plunger.

8. In an internal combustion engine, a cylinder having a reciprocable piston therein, a valve having a combustion chamber in constant communication with said cylinder and also having a side port, a fuel chamber, a passage leading from said fuel chamber to the valve and communicating with the combustion chamber through said side port during a portion of the compression stroke of the piston whereby a compressed fuel mixture is formed in said fuel chamber, a reciprocable plunger in said fuel chamber adapted to draw fuel into the chamber during one stroke thereof and to compress the fuel mixture therein to a pressure greater than the pressure in said combustion chamber during the opposite stroke thereof, and means drivingly connected to the valve for reciprocating said plunger.

9. In an internal combustion engine, a cylinder having a reciprocable piston therein, a valve having a combustion chamber in constant communication with said cylinder and also having a port communicating with said chamber, a fuel chamber, means for rotating said valve to bring said valve port into communication with said fuel chamber during a portion of the compression stroke of the piston whereby a charge of compressed air is forced into said fuel chamber from the combustion chamber and a compressed fuel mixture produced therein, and means for additionally compressing said fuel mixture within said fuel chamber to a pressure greater than the pressure in said combustion chamber while said valve port is in communication therewith.

10. In an internal combustion engine, a cylinder having a reciprocable piston therein, a rotatable valve having a combustion chamber in constant communication with said cylinder and also having a port communicating with said chamber, a fuel chamber, means for rotating said valve to bring said valve port into communication with said fuel chamber during a portion of the compression stroke of the piston whereby a charge of compressed air is forced into said fuel chamber from the combustion chamber and a compressed fuel mixture produced therein, and means including a reciprocable plunger for additionally compressing said fuel mixture within said fuel chamber to a pressure greater than the pressure in said combustion chamber while said valve port is in communication therewith.

11. In an internal combustion engine, a cylinder having a reciprocable piston therein, a rotatable valve having a combustion chamber in constant communication with said cylinder and also having a port communicating with said chamber, a fuel chamber, means for rotating said valve to bring said valve port into communication with said fuel chamber during a portion of the compression stroke of the piston whereby a charge of compressed air is forced into said fuel chamber from the combustion chamber and a compressed fuel mixture produced therein, means including a reciprocable plunger for additionally compressing said fuel mixture within said fuel chamber to a pressure greater than the pressure in said combustion chamber while said valve port is in communication therewith, and means drivingly connected to said valve for reciprocating said plunger.

12. In an internal combustion engine, a cylinder having a reciprocable piston therein, a rotatable valve having a combustion chamber in constant communication with said cylinder and also having a port communicating with said chamber, a fuel chamber, means for rotating said valve to bring said valve port into communication with said fuel chamber during a portion of the compression stroke of the piston whereby a charge of compressed air is forced into said fuel chamber from the combustion chamber and a compressed fuel mixture produced therein, means including a reciprocable plunger for additionally compressing said fuel mixture within said fuel chamber to a pressure greater than the pressure in said combustion chamber while said valve port is in communication therewith, and cam means drivingly connected to said valve for reciprocating said plunger.

13. In an internal combustion engine, a cylinder having a reciprocable piston therein, a rotatable valve provided with a combustion chamber communicating with said cylinder, said chamber having a port adapted to register in succession with exhaust and air intake passages during rotation of the valve, an injection cylinder having a reciprocable plunger adapted to draw fuel thereinto during the suction stroke of the plunger, means for rotating said valve to effect communication between said valve port and injection cylinder during a portion of the compression stroke of the piston whereby a charge of compressed air is forced into said injection cylinder from the combustion chamber and a compressed fuel mixture produced in said injection cylinder, and means for shifting said plunger to additionally compress said mixture to a pressure greater than the pressure in said combustion chamber while said valve port is in communication with said injection cylinder.

14. In an internal combustion engine, a cylinder having a reciprocable piston therein, a rotatable valve provided with a combustion chamber communicating with said cylinder, said chamber having a port adapted to register in succession with exhaust and air intake passages during rotation of the valve, an injection cylinder having a reciprocable plunger adapted to draw fuel thereinto during the suction stroke of the plunger, means for rotating said valve to effect communication between said valve port and injection cylinder during a portion of the compression stroke of the piston whereby a charge of compressed air is forced into said injection cylinder from the combustion chamber and a compressed fuel mixture produced in said injection cylinder, and means drivingly connected to said valve rotating means for shifting said plunger to additionally compress said mixture to a pressure greater than the pressure in said combustion chamber while said valve port is in communication with said injection cylinder.

15. In an internal combustion engine having a cylinder and a reciprocable piston therein, a valve formed with a combustion chamber communicating with the cylinder, a fuel chamber, a reciprocable plunger in said fuel chamber shiftable in one direction to draw fuel into the fuel chamber while said combustion chamber is out of communication with the fuel chamber, means effecting communication between said chambers during a portion of the compression stroke of the piston, and means for shifting said plunger in the opposite direction to compress a fuel mixture in said fuel chamber to a pressure greater than the pressure in said combustion chamber while said chambers are in communication with each other.

16. In an internal combustion engine having a cylinder and a reciprocable piston therein, a rotatable valve formed with a combustion chamber communicating with the cylinder, a fuel chamber, a reciprocable plunger in said fuel chamber shiftable in one direction to draw fuel into the fuel chamber while said combustion chamber is out of communication with the fuel chamber, means effecting communication between said chambers during a portion of the compression stroke of the piston, means for shifting said plunger in the opposite direction to compress a fuel mixture in said fuel chamber to a pressure greater than the pressure in said combustion chamber while said chambers are in communication with each other, and a common means for rotating said valve and operating said plunger shifting means.

17. In an internal combustion engine having a cylinder and a reciprocable piston therein, a valve formed with a combustion chamber communicating with the cylinder, a fuel chamber, a reciprocable plunger in said fuel chamber shiftable in one direction to draw fuel into the fuel chamber while said combustion chamber is out of communication with the fuel chamber, means including a restricted passage effecting communication between said chambers during a portion of the compression stroke of the piston, and means for shifting said plunger in the opposite direction to compress a fuel mixture in said fuel chamber to a pressure greater than the pressure in said combustion chamber while said chambers are in communication with each other and during another portion of the compression stroke of the piston.

18. In an internal combustion engine having a cylinder and a reciprocable piston therein, a cylinder head having a recess, a valve in said recess formed with a combustion chamber opening into the cylinder and provided with a side port communicating with said chamber, a fuel chamber in said cylinder head at one side of the valve, a passage including a restricted portion leading from said fuel chamber to said recess, means for operating said valve to register said side port and passage during the compression stroke of the piston, and means in said fuel chamber for compressing a fuel mixture therein to a pressure greater than the pressure in said combustion chamber while said side port and passage are in communication with each other.

19. In an internal combustion engine having a cylinder and a reciprocable piston therein, a cylinder head having a recess, a rotatable valve in said recess formed with a combustion chamber opening into the cylinder and provided with a side port communicating with said chamber, a fuel chamber in said cylinder head at one side of the valve, a passage leading from said fuel chamber to said recess, means for rotating said valve to register said side port and passage during the compression stroke of the piston and a reciprocating plunger for compressing a fuel mixture in said fuel chamber to a pressure greater than the pressure in said combustion chamber.

20. In an internal combustion engine having a cylinder and a reciprocable piston therein, a cylinder head having a recess, a rotatable valve in said recess formed with a combustion chamber opening into the cylinder and provided with a side port communicating with said chamber, a fuel chamber in said cylinder head at one side of the valve, a restricted passage leading from said fuel chamber to said recess, means for rotating said valve to register said side port and passage during the compression stroke of the piston, and means operated from said valve rotating means for compressing a fuel mixture in said fuel chamber to a pressure greater than the pressure in said combustion chamber.

21. In an internal combustion engine having a cylinder and a reciprocable piston therein, a cylinder head having a recess, a rotatable valve in said recess formed with a combustion chamber opening into the cylinder and provided with a side port communicating with said chamber, a fuel chamber in said cylinder head at one side of the valve, a passage leading from said fuel chamber to said recess, means for rotating said valve to register said side port and passage during the compression stroke of the piston, a reciprocating plunger for compressing a fuel mixture in said fuel chamber to a pressure greater than the pressure in said combustion chamber, and means including a cam operated from said valve rotating means for reciprocating said plunger.

22. In an internal combustion engine having a cylinder and a reciprocable piston therein, a cylinder head having a recess, a rotatable valve in said recess formed with a combustion chamber opening into the cylinder and provided with a side port communicating with said chamber, a fuel chamber in said cylinder head at one side of the valve, a passage leading from said fuel chamber to said recess, means for rotating said valve to bring said side port into communication with said passage during a portion of the compression stroke of the piston, and means in said fuel chamber operative during succeeding portion of said compression stroke for compressing a fuel mixture therein to a greater pressure than the pressure in said combustion chamber, thereby to fire the mixture by the heat of compression.

23. In an internal combustion engine having a cylinder and a reciprocable piston therein, a cylinder head having a recess, a rotatable valve in said recess formed with a combustion chamber opening into the cylinder and provided with a side port communicating with said chamber, a fuel chamber in said cylinder head at one side of the valve, a passage leading from said fuel chamber to said recess, means for rotating said valve to register said side port and passage during the compression stroke of the piston, and means in said fuel chamber for compressing a fuel mixture therein while said side port and passage are in communication with each other.

24. In an internal combustion engine having a cylinder and a reciprocable piston therein, a cylinder head having a recess, a valve in said recess formed with a combustion chamber opening into the cylinder and provided with a side port communicating with said chamber, a fuel chamber in said cylinder head at one side of the valve, a passage leading from said fuel chamber to said recess, means for operating said valve to register said side port and passage during the compression stroke of the piston, and means in said fuel chamber for compressing a fuel mixture therein to a pressure greater than the pressure in said combustion chamber while said side port and passage are in communication with each other, said last named means adapted to draw fuel into said fuel chamber when said side port and passage are out of communication with each other.

WALDO G. GERNANDT.

REFERENCES CITED

The following references are of record in the file of this patent:

UNITED STATES PATENTS

| Number | Name | Date |
| --- | --- | --- |
| 878,934 | Brady | Feb. 11, 1908 |
| 1,079,422 | McKetchnie | Nov. 25, 1913 |
| 1,026,871 | Lake | May 21, 1912 |
| 1,238,560 | Offeldt | Aug. 28, 1917 |
| 2,327,470 | Tjaarda | Aug. 24, 1943 |
| 2,331,801 | Rodgers | Oct. 12, 1943 |
| 2,144,862 | Truxell | Jan. 24, 1939 |

Certificate of Correction

Patent No. 2,415,130.  February 4, 1947.

WALDO G. GERNANDT

It is hereby certified that errors appear in the printed specification of the above numbered patent requiring correction as follows: Column 7, line 43, claim 4, strike out the word "thereof"; column 12, line 3, claim 23, strike out "rotatable"; line 8, same claim, after "passage" insert *having a restricted portion*; and that the said Letters Patent should be read with these corrections therein that the same may conform to the record of the case in the Patent Office.

Signed and sealed this 28th day of October, A. D. 1947.

[SEAL]

THOMAS F. MURPHY,
*Assistant Commissioner of Patents.*